US006748701B2

(12) United States Patent
Gelin et al.

(10) Patent No.: US 6,748,701 B2
(45) Date of Patent: Jun. 15, 2004

(54) BURGLAR PROOF DEVICE FOR OPENING PANEL

(75) Inventors: Michel Gelin, Rouen (FR); Christian Badel, Crolles (FR); Jean-Luc Buiret, Meylan (FR); Jean-Claude Dromard, Chapareillan (FR)

(73) Assignee: Atral, Crolles (FR)

( * ) Notice: Subject to any disclaimer, the term of this patent is extended or adjusted under 35 U.S.C. 154(b) by 0 days.

(21) Appl. No.: 10/148,265

(22) PCT Filed: Nov. 29, 2000

(86) PCT No.: PCT/FR00/03335

§ 371 (c)(1), (2), (4) Date: Sep. 27, 2002

(87) PCT Pub. No.: WO01/40609

PCT Pub. Date: Jun. 7, 2001

(65) Prior Publication Data

US 2003/0089039 A1 May 15, 2003

(30) Foreign Application Priority Data

Nov. 30, 1999 (FR) .......................................... 99 15229

(51) Int. Cl.[7] .................................................. B60J 5/00
(52) U.S. Cl. ........................................... 49/462; 70/432
(58) Field of Search ........................... 49/13, 460, 462; 70/DIG. 49, 432, 434, DIG. 39; 340/540, 541, 542, 545.1

(56) References Cited

U.S. PATENT DOCUMENTS

| | | | | | |
|---|---|---|---|---|---|
| 3,378,830 | A | * | 4/1968 | Patrick | 49/13 |
| 3,410,245 | A | * | 11/1968 | Kashden et al. | 49/13 |
| 3,641,540 | A | * | 2/1972 | Cutler et al. | 340/224 |
| 3,772,669 | A | * | 11/1973 | Johnston et al. | 340/224 |
| 5,461,363 | A | * | 10/1995 | Chang | 340/521 |

FOREIGN PATENT DOCUMENTS

| | | |
|---|---|---|
| EP | 0 208 876 | 1/1987 |
| EP | 0 245 682 | 11/1987 |
| FR | 2 577 605 | 8/1986 |
| FR | 2 632 008 | 12/1989 |

* cited by examiner

*Primary Examiner*—Jerry Redman
(74) *Attorney, Agent, or Firm*—Young & Thompson

(57) ABSTRACT

A burglar-proof device designed to be fixed on one surface of a receiving wall located in or proximate to at least part of the periphery of an opening panel such as a door or a shutter, includes an elongated tubular element (7, 25) having a support wall (8) urged to be supported on the receiving surface (5), at least a fixing member (12, 12*a*) passing through a passage provided in the support wall (8) of the elongated element and which is fixed on the opening panel (2), at least an elastic return member (15) arranged in the elongated element, and at least a movement sensor mounted in the elongated element and co-operating with the receiving wall, so that, when the elongated element is stressed to counter the elastic member and moves away from the receiving wall, the movement sensor is capable of delivering an electric signal.

14 Claims, 7 Drawing Sheets

BURGLAR PROOF DEVICE FOR OPENING PANEL

BACKGROUND OF THE INVENTION

The subject of the present invention is a device acting as a tell-tale of an attempt to break into an opening panel, it being possible for such an opening panel to be a door to a building or to a house, installed on the outside or on the inside, a shutter with one or more swing leaves, a door or lid to an item of furniture such as a chest.

DESCRIPTION OF THE RELATED ART

One of the ways commonly used for breaking into a building, a house or into premises in particular, or for forcing a chest consists in engaging a penetrating tool such as a crowbar or a cold chisel between the door and its surround so as to reach the lock bolt of the lock or the ratch or the hinges of the door.

Several solutions have already been proposed for detecting such attempted break-ins.

In particular, international patent application WO-A-99/38134 describes a burglar-proof device which comprises an elongate tubular element which is fixed securely to the exterior face of the surround of an opening panel and which, on the same side as the slot separating the surround from the door, has a deformable wall which can act on an electric displacement sensor.

Other known burglar-proof devices are designed to be installed in the space between the opening panel and its surround. This is the case in particular of the burglar-proof device described in European patent application EP-A-0 208 876, which comprises two longitudinal fixed parts distant from one another and the space between which is obstructed by a longitudinal blade which pivots against the action of a spring when acted upon by a forcing tool.

SUMMARY OF THE INVENTION

The object of the present invention is to propose a burglar-proof device which is simpler and more effective than those currently known.

The burglar-proof device according to the invention can be fixed to a surface of a receiving wall situated in or in the vicinity of at least part of the periphery of an opening panel such as a door or a shutter.

According to the invention, this device comprises an elongate tubular element having a bearing wall bearing against said receiving surface, at least one fastening member which passes through a passage formed in said bearing wall of the elongate element and which is fastened to said receiving wall, at least one elastic return member placed in said elongate element and interposed between said fastening member and said bearing wall of this elongate element, and at least one displacement sensor installed in said elongate element and collaborating with said receiving wall, so that when said elongate element is urged against the action of said elastic member and moves away from said receiving wall, said displacement sensor is able to deliver an electric signal.

According to a preferred alternative form of the invention, said elastic member comprises two opposed branches the central part of which cooperates with said fastening member and the end parts of which bear against said bearing wall of the elongate element.

According to an alternative form of the invention, said fastening member comprises a spacer bearing against said receiving wall and comprising wings for holding said elastic member and a central passage for the passage of a fastening element such as a screw.

According to another alternative form of the invention, said fastening member comprises a spacer bearing against said receiving wall and having a central passage for the passage of a fastening element such as a screw, said elastic member being sandwiched between this spacer and the head of this fastening element.

According to the invention, said spacer may advantageously comprise an inclined ramp along which said elongate element can rise when urged laterally.

According to a preferred alternative form of the invention, said elongate element comprises a first section piece in the shape of a U, the base of which constitutes said bearing wall and a second section piece in the shape of a U which envelopes and covers said first section piece and which clips onto said first section piece.

According to an additional alternative form of the invention, said elongate element carries a plate designed to stretch forward from the actuating member of a means of locking the opening panel, this plate having an opening for the passage of a key which can be introduced into this actuating member.

According to an alternative form of the invention, a displacement sensor is inserted between said plate and the surface of the opening panel.

According to the invention, said displacement sensor preferably consists of a switch.

According to the invention, the body of said switch may also be subjected to a spring acting toward said receiving wall.

According to the invention, the device is preferably installed against a surface of the door.

According to an alternative form of the invention, the device could be installed against a surface of the door surround.

The present invention will be better understood upon studying some opening-panel burglar-proof devices which are described by way of nonlimiting examples and illustrated in the drawing in which.

DESCRIPTION OF THE PREFERRED EMBODIMENTS

Figure 1:
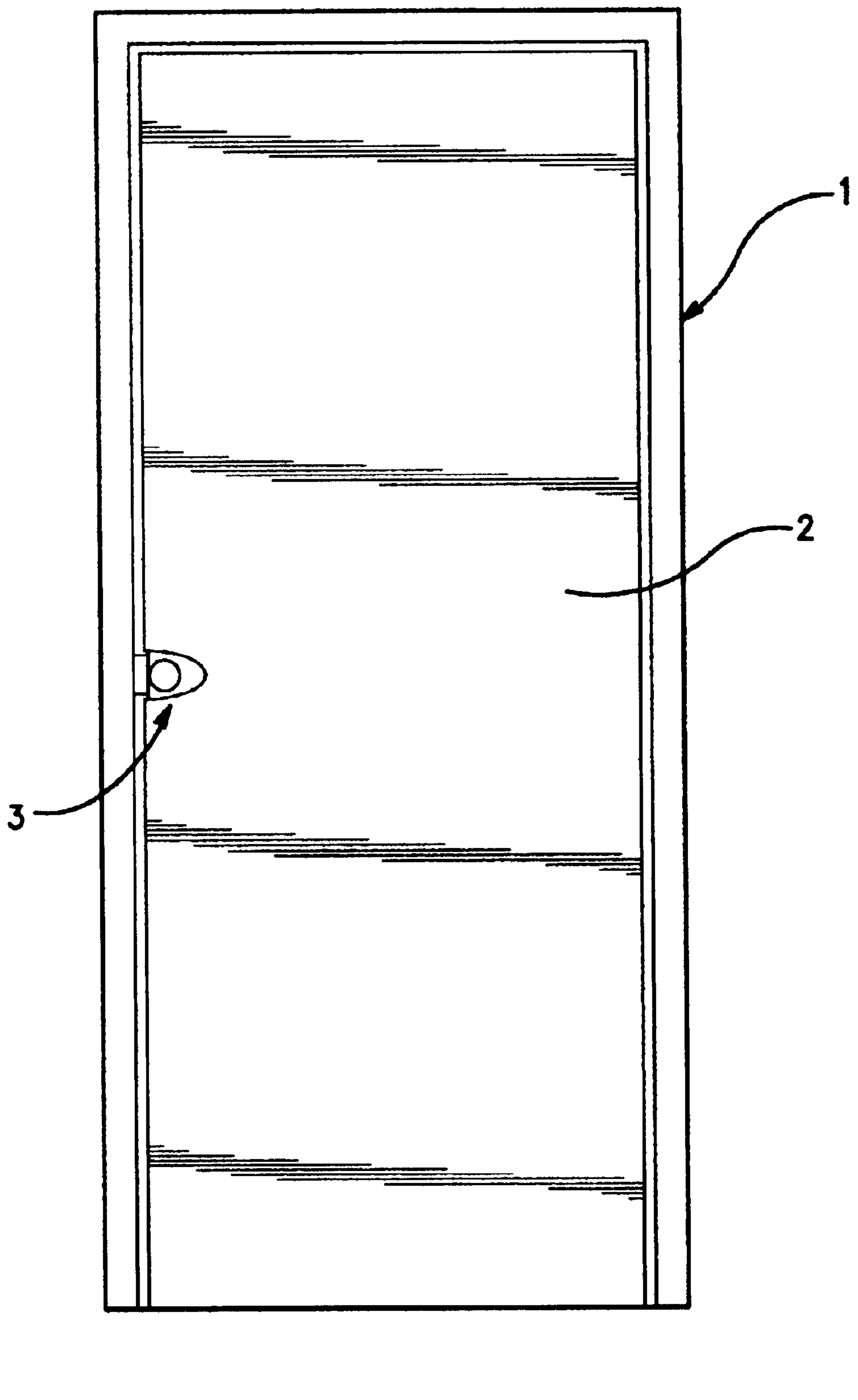
FIG. 1 depicts an external view of a door in a closed position, equipped with a burglar-proof device.
Figure 2:
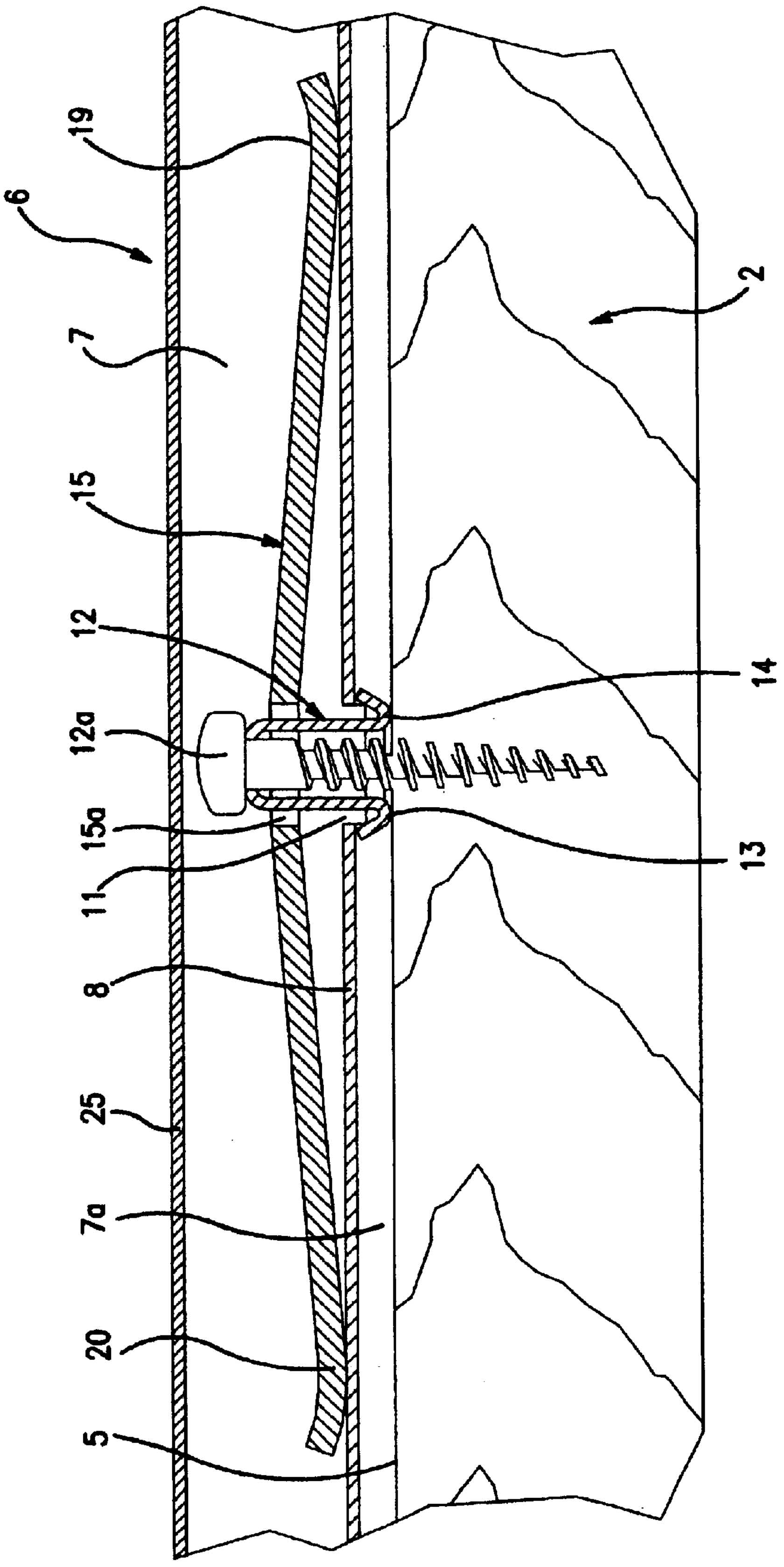
FIG. 2 depicts a partial longitudinal section, along its main axis, of a first burglar-proof device according to the invention, showing an elastic fastening means.
Figure 3:
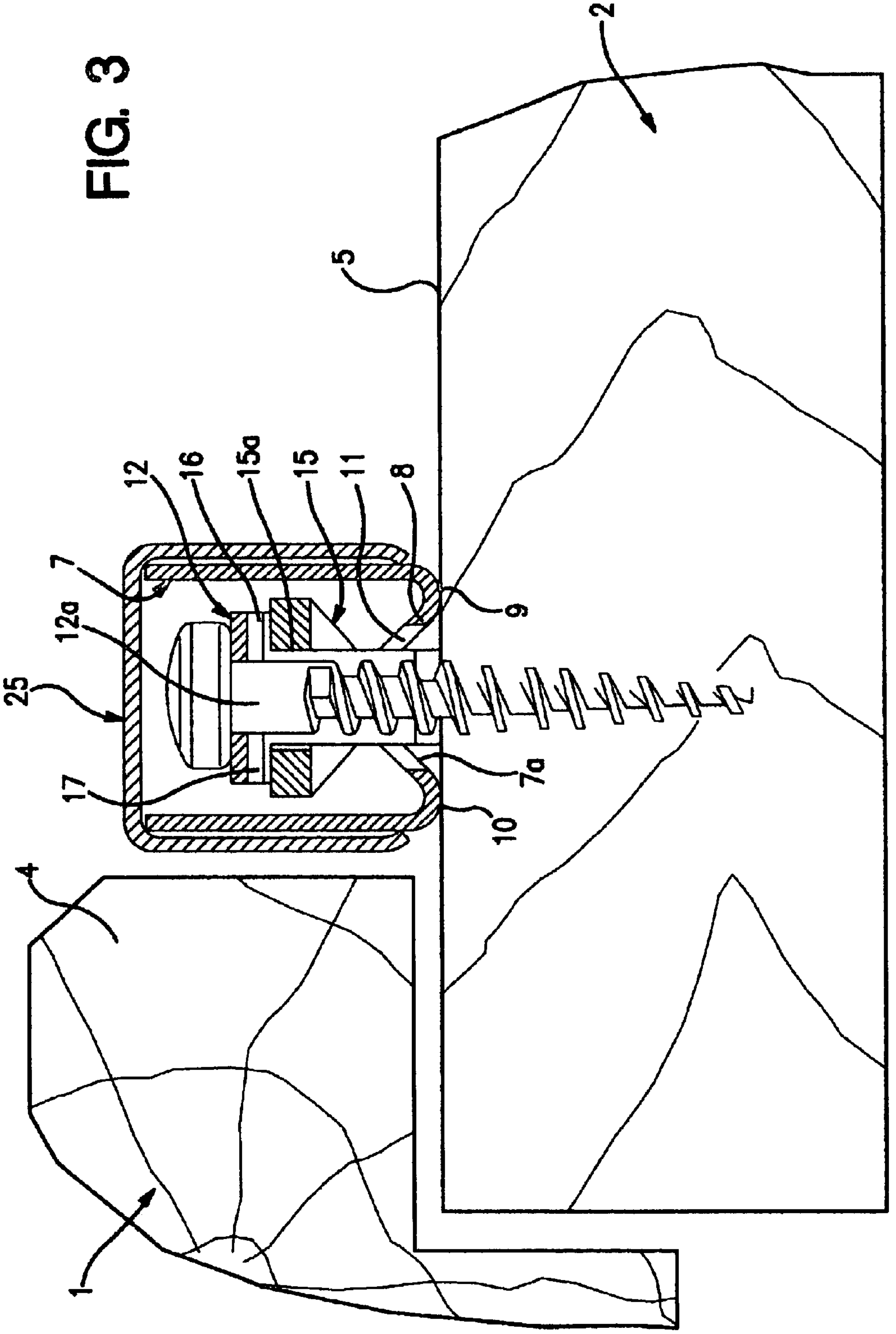
FIG. 3 depicts a cross section, along its main axis, of the burglar-proof device of FIG. 2.

Referring in particular to FIGS. 1 to 3, it is possible to see that there has been depicted a surround 1 of a door 2 equipped with a key-operated lock 3, the surround 1 having a projecting part 4 against which the exterior face 5 of the door 2 rests when brought to the closed position.

In the immediate vicinity of the projecting part 4 of the surround 1, the exterior face 5 of the door 2 is equipped with an elongate burglar-proof device 6 which extends around its periphery and advantageously comprises two vertical parts which run along the uprights of the surround 1 and one horizontal part which runs along the top cross member of this surround.

The burglar-proof device 6 comprises a section piece 7 of U-shaped cross section, the bottom 8 of which has two longitudinal regions 9 and 10 bearing against the exterior face 5 of the door 2 and which are separated by a longitudinal groove 7*a*.

At various points along its length, the bottom 8 of the section piece 7 has central through-passages 11, of square or rectangular shape.

Installed through each passage 11 is a fastening member which comprises a spacer 12.

In the example of FIGS. 2 and 3, the spacer 12 is, in longitudinal section with respect to the section 7, U-shaped, with the ends 13 and 14 of its branches bearing against the exterior face 5 of the door 2 and bent under the wall 8 of the section piece 7, in its longitudinal groove 6*a*.

Each spacer 12 passes through a passage 15*a* in the central part of a leaf spring 15 which runs longitudinally with respect to the section piece 7 and has two opposed longitudinal branches.

The spacer 12 has wings 16 and 17 which run past the central part of the leaf spring 15 and this spacer 12 is fixed to the door 2 by a central screw 12*a* the shank of which passes through the central part of the spacer 12 to screw into the door 2 and the head of which bears against this central part.

The spring 15 is formed in such a way that the ends 18 and 19 of its opposed branches bear against the interior face of the wall 8 of the section piece 7 when its central part is bearing against the wings 16 and 17 of the spacer 12, distant from the wall 8, so that the section piece 7 is firmly, but with a preload, held against the exterior surface 5 of the door 2.

Because of the bent-up ends 13 and 14 of the spacer 12 and because of its holding wings 16 and 17, each spacer 12 each spring 15 can be pre-installed in the section piece 7.

Figure 4:
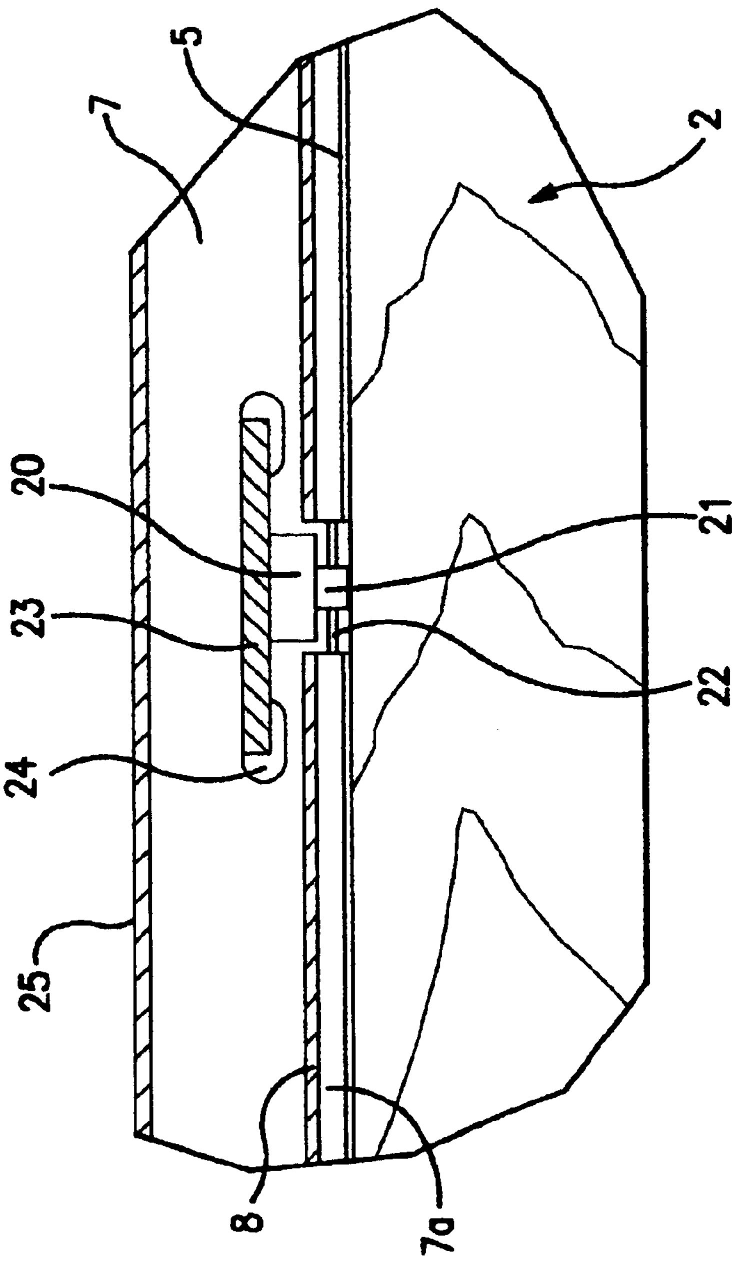
FIG. 4 depicts a cross section of another part of the burglar-proof device of FIG. 2, showing a displacement sensor.

As FIG. 4 shows, the section piece 7 bears internally, at various points along its length and in its regions which are not covered by the leaf springs 15, displacement sensors consisting of electric switches 20 the moving parts 21 of which pass through through-passages 22 formed in the wall 8 of the section piece 7.

In the example depicted in FIG. 4, the switches 20 are borne by plates 23 which have studs engaged in orifices 24 formed in the flanks of the section piece 7.

Furthermore, the switches 20 are connected, by electric wires running along the section piece 7, to an electronic alarm circuit, not depicted.

The device 6 further comprises a longitudinal covering section piece 25 of U-shaped cross section, which is force-fitted astride the section piece 7 in such a way as to cover its external opening and collaborate with its flanks to hold it in place.

By virtue of the arrangement which has just been described, if a tool is engaged in the space between the projecting part 4 of the surround 1 and the structure of the device 6, which structure is made up of the section pieces 7 and 25, or if a tool is engaged between the wall 8 of the section piece 7 and the exterior face 5 of the door 2, or if an attempt is made to pull the covering section piece 25 off, the structure made up of the section pieces 7 and 25 is acted upon and moves against the action of the leaf springs 15, moving away from the exterior face 5 of the door 2.

When they have travelled beyond a certain distance determined by their position, at least one of the switches 20 changes state because its moving part 21 is actuated. A corresponding electric signal is then transmitted to the electronic alarm circuit which processes it to, in particular, set off a warning means such as a siren.

When the device 6 is no longer acted upon, and provided that it has not been at least partially destroyed, it returns normally to its starting position.

Figure 5:
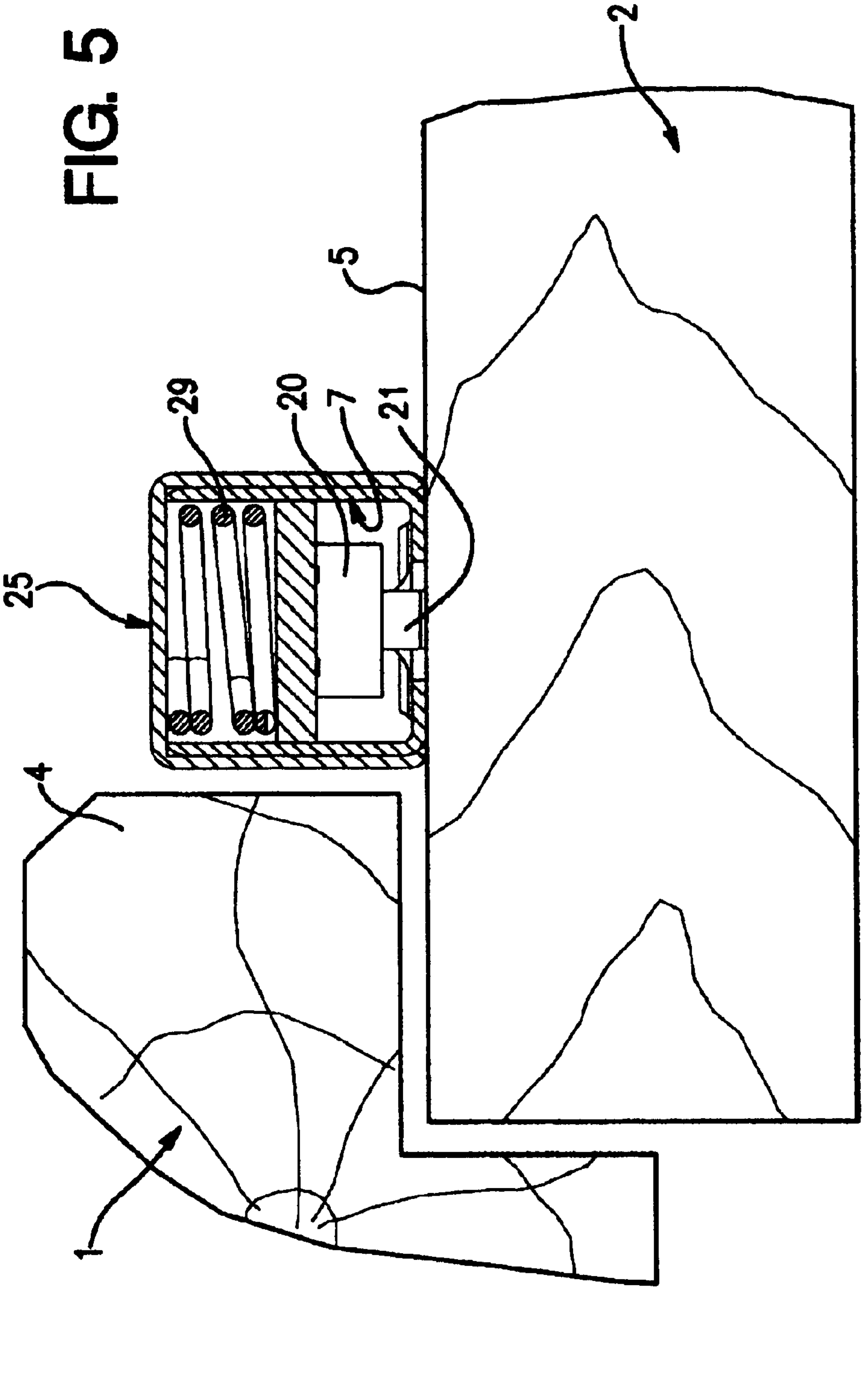
FIG. 5 depicts a cross section along its main axis of an alternative form of embodiment of the burglar-proof device of FIG. 4.

In the alternative form depicted in FIG. 5, each switch 20 is no longer fixed to the section piece 7 but is urged toward the exterior surface 5 of the door 2 by a spring 29 preloaded according to the spring acting upon its moving part 21.

Figure 6:
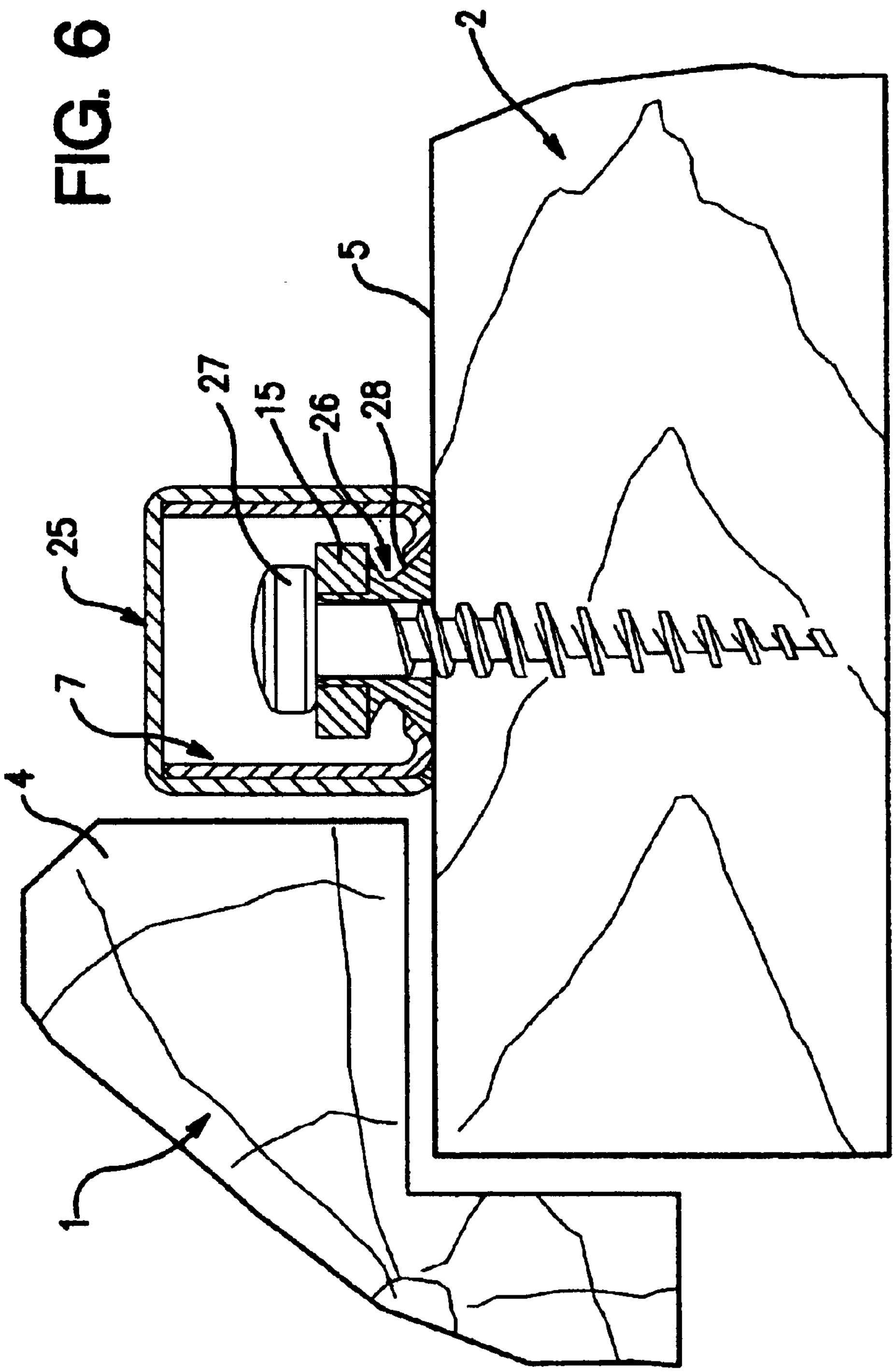
FIG. 6 depicts a cross section of an alternative form of embodiment of the burglar-proof device of FIG. 2.

In the alternative form of embodiment depicted in FIG. 6, it can be seen that the previous spacer 12 is replaced by a spacer 26 consisting of a thick washer inserted between the central part of the spring 15, the stack consisting of the washer 26 and the central part of the spring 15 being fixed by a screw 27 which passes through them and which is screwed into the door 2.

In this alternative form, the washer 26 has an annular ramp 28 against which the section piece 7 can slide when the latter is displaced parallel to the door 2.

This ramp 28 makes it easier for the elongate structure made up of the section pieces 7 and 26 to be moved away from the exterior face 5 of the door 2 when this structure moves or is urged parallel to the door 2.

Figure 7:
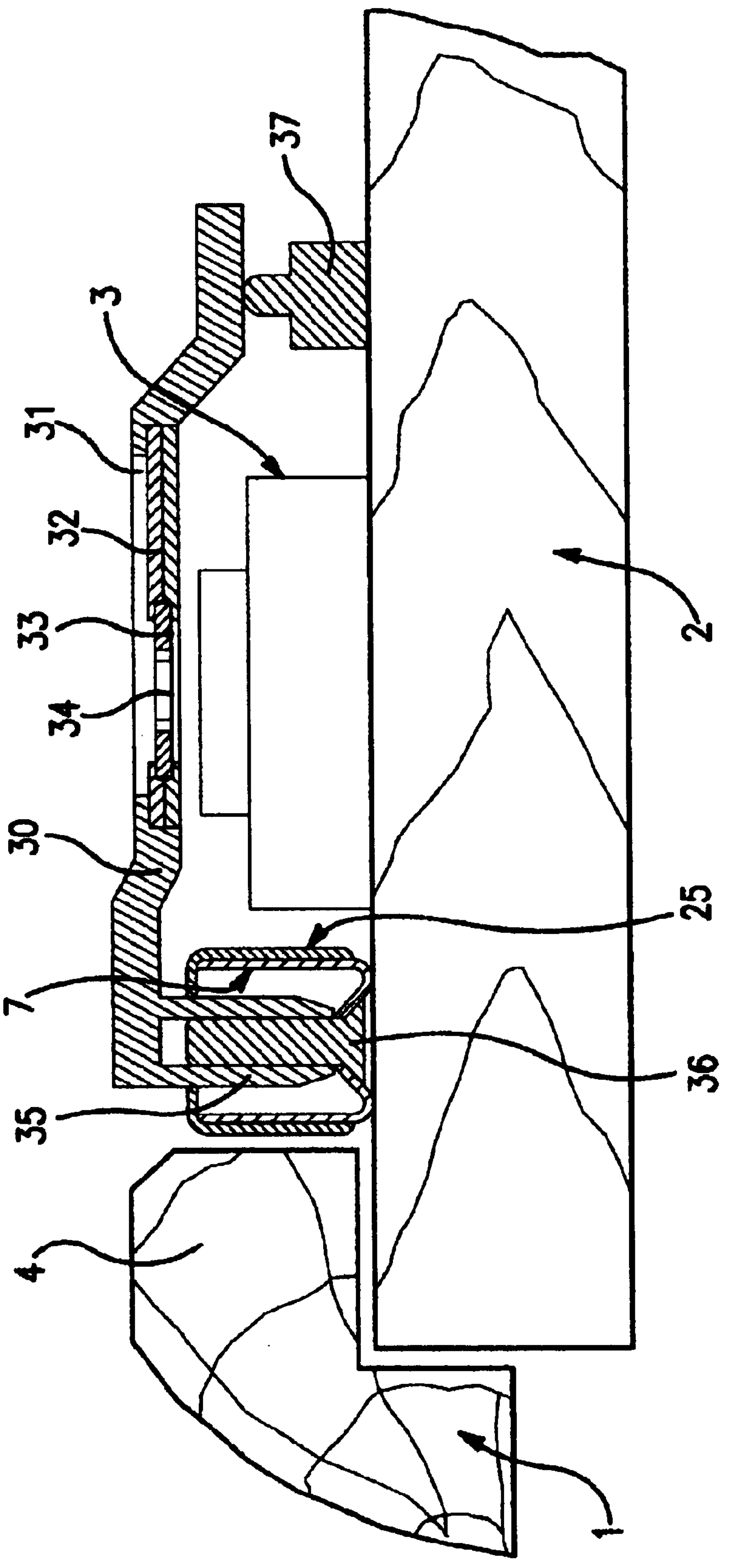
FIG. 7 depicts a cross section of another part of the aforementioned burglar-proof device, associated with a lock.

Referring now to FIG. 7, it can be seen that the covering section piece 25 bears a plate 30 which runs parallel to and some distance from the exterior face 5 of the door 2, past and some distance away from the cylinder of the lock 3 of this door, which cylinder is depicted schematically.

This plate 30 has a passage 31 in which there is installed a rotating washer 32 which, eccentrically, bears an anti-drill washer 33 equipped with an off-centered slot 34 for the passage of a key for operating the cylinder of the lock 3. The plate 30 bears a finger 35 which is engaged through the bottom of the section piece 25 and a holding screw 36 which passes through the wall 8 of the section piece 7 is screwed axially into this finger 35, the head of this screw being placed in the longitudinal groove 7*a* of the section piece 7.

Thus, if any attempt is made at reaching the lock 3 using a forcing tool, the plate 30 is made to move and this results in a displacement of the structure made up of the section pieces 7 and 25 thus, as described before, operating at least one of the switches 20.

Furthermore, a displacement sensor, consisting for example of an electric switch 37, could be arranged between the surface 5 of the door 2 and the rear face of the plate 30 so as to detect any moving-apart and/or moving-together of this plate and the door 2, a corresponding electric signal also being transmitted to the aforementioned alarm circuit by an electric wire, not depicted.

Of course, the number of points of elastic fastening and the number of displacement sensors installed along the displaceable structure made up of the section pieces 7 and 25 will be tailored to the length of these and to their ability not to twist when this structure is acted upon.

The present invention is not restricted to the examples described hereinabove.

In particular, the burglar-proof device described could be fixed to the protruding part 20 of the surround 1 or into a groove formed in the door or in the surround and could be constructed differently without departing from the scope of the attached claims.

What is claimed is:

1. A burglar-proof device which can be fixed to a receiving surface of a receiving wall situated in or in a vicinity of at least part of a periphery of an opening panel, characterized in that it comprises an elongate tubular element (7, 25) having a bearing wall (8) bearing against said receiving surface (5), at least one fastening member **(12, 12*a*) which passes through a passage formed in said bearing wall (8) of the elongate element and which is fastened to said receiving wall (2), at least one elastic return member (15) placed in said elongate element and interposed between said fastening member and said bearing wall of the elongate element, and at least one displacement sensor (20)** installed in said elongate element and collaborating with said receiving wall, so that when said elongate element is urged against the action of said elastic member and moves away from said receiving wall, said displacement sensor is able to deliver an electric signal.

2. The device as claimed in claim 1, characterized in that said elastic member (15) comprises two opposed branches, a central part of which cooperates with said fastening member **(12, 12*a*) and end parts (18, 19) of which bear against said bearing wall (8)** of the elongate element.

3. The device as claimed in claim 1, characterized in that said fastening member comprises a spacer (12) bearing against said receiving wall and comprising wings (16, 17) for holding said elastic member (15) and a central passage for the passage of a fastening element such as a screw **(12*a*)**.

4. The device as claimed in claim 3, characterized in that said spacer comprises an inclined ramp along which said elongate element can rise when urged laterally.

5. The device as claimed in claim 1, characterized in that said fastening member comprises a spacer (26) bearing against said receiving wall and having a central passage for the passage of a fastening element such as a screw (27), said elastic member (15) being sandwiched between the spacer and a head of this fastening element.

6. The device as claimed claim 1, characterized in that said elongate element comprises a first section piece (7) in the shape of a U, the base of which constitutes said bearing wall and a second section piece (25) in the shape of a U which envelopes and covers said first section piece and which clips onto said first section piece.

7. The device as claimed in claim 1, characterized in that said elongate element carriers a plate (30) designed to stretch forward from the actuating member of a means (3) of locking and opening panel, this plate being equipped with an anti-drill washer (34) having an opening for the passage of a key which can be introduced into said actuating member.

8. The device as claimed in claim 7, characterized in that between said plate and the surface of the opening panel is inserted a displacement sensor that senses the displacement of said plate and the surface of the door with respect to the other.

9. The device as claimed in claim 1, characterized in that said displacement sensor consists of an electric switch.

10. The device as claimed in claim 7, characterized in that a body of said switch is subjected to a spring (29) acting toward said receiving wall.

11. The device as claimed in claim 1, characterized in that the device is installed against a surface of said opening panel.

12. The device as claimed in claim 1, characterized in that the device is installed against a surface of a door surround.

13. The device of claim 1, wherein the opening panel is a door.

14. The device of claim 1, wherein the opening panel is a shutter.

* * * * *